June 28, 1966  G. O. GARIS ETAL  3,257,918
EARTH WORKING APPARATUS
Filed Feb. 19, 1963  3 Sheets-Sheet 2

INVENTORS
GORDON O. GARIS
BY ADOLPH H. WENDEL
ATTORNEYS

June 28, 1966  G. O. GARIS ETAL  3,257,918
EARTH WORKING APPARATUS
Filed Feb. 19, 1963  3 Sheets-Sheet 3

INVENTORS
GORDON O. GARIS
BY ADOLPH H. WENDEL
Carlsen, Carlsen & Sturm
ATTORNEYS

United States Patent Office 3,257,918
Patented June 28, 1966

3,257,918
EARTH WORKING APPARATUS
Gordon O. Garis, Golden Valley, and Adolph H. Wendel, Minneapolis, Minn., assignors to Bros Incorporated, Minneapolis, Minn., a corporation of Minnesota
Filed Feb. 19, 1963, Ser. No. 259,529
7 Claims. (Cl. 94—50)

This invention relates generally to the field of ponderomotive earth working apparatus and is more particularly directed to lubrication systems therefor.

The development of improvements in the art with which our invention is concerned have placed ever increasing demands on the capabilities of the components of which the apparatus is comprised. For example, while it has been known for some time that the sub-base and bases for roads and aircraft runways must be compacted to provide a dense load carrying mass, it has only been within the last decade or so that equipment has been developed to efficiently accomplish this result. One such form of equipment utilizes a relatively lightweight roller which is slowly moved over the surface of an area to be compacted. Inside of the roller an eccentric mass is rotated at a relatively high rotational speed with respect to the rotation of the roller itself and vibratory forces of predetermined frequency set up therefrom are utilized to compact the mass over which the apparatus is passing. The majority of the substances to be compacted are most efficiently compacted when vibrated at an experimentally determined resonant frequency which normally falls within the range of 1100 to 1600 vibrations per minute. While the overall weight of the roller and the eccentric mass is substantially less than that previously utilized for compacting materials, large dynamic forces are present which require bearings of substantial size and cost and which in turn must be adequately lubricated to prevent premature failure under operating conditions.

Due to the relatively high rotational speed of the shaft upon which the eccentric mass is carried, it has been determined that the common and readily available lubrication systems are inadequate for this purpose.

Our invention provides a lubrication system which utilizes the relative difference in rotational speed between the roller and the shaft upon which the eccentric mass is carried; or, more simply, the difference in rotational speed between a shaft journaled within a rotating shaft or housing to provide a means for distributing an adequate supply of lubrication.

It is therefore an object of this invention to provide an improved lubrication system for apparatus embodying a pair of shafts which rotate at different velocities.

It is a further object of this invention to provide an improved lubrication system for ponderomotive earth working apparatus.

Another object of this invention is to provide an improved lubrication system for a vibratory earth compacting roller apparatus.

These and other more detailed and specific objects will be disclosed in the course of the following specification, reference being had to the accompanying drawings, in which—

Figure 1:
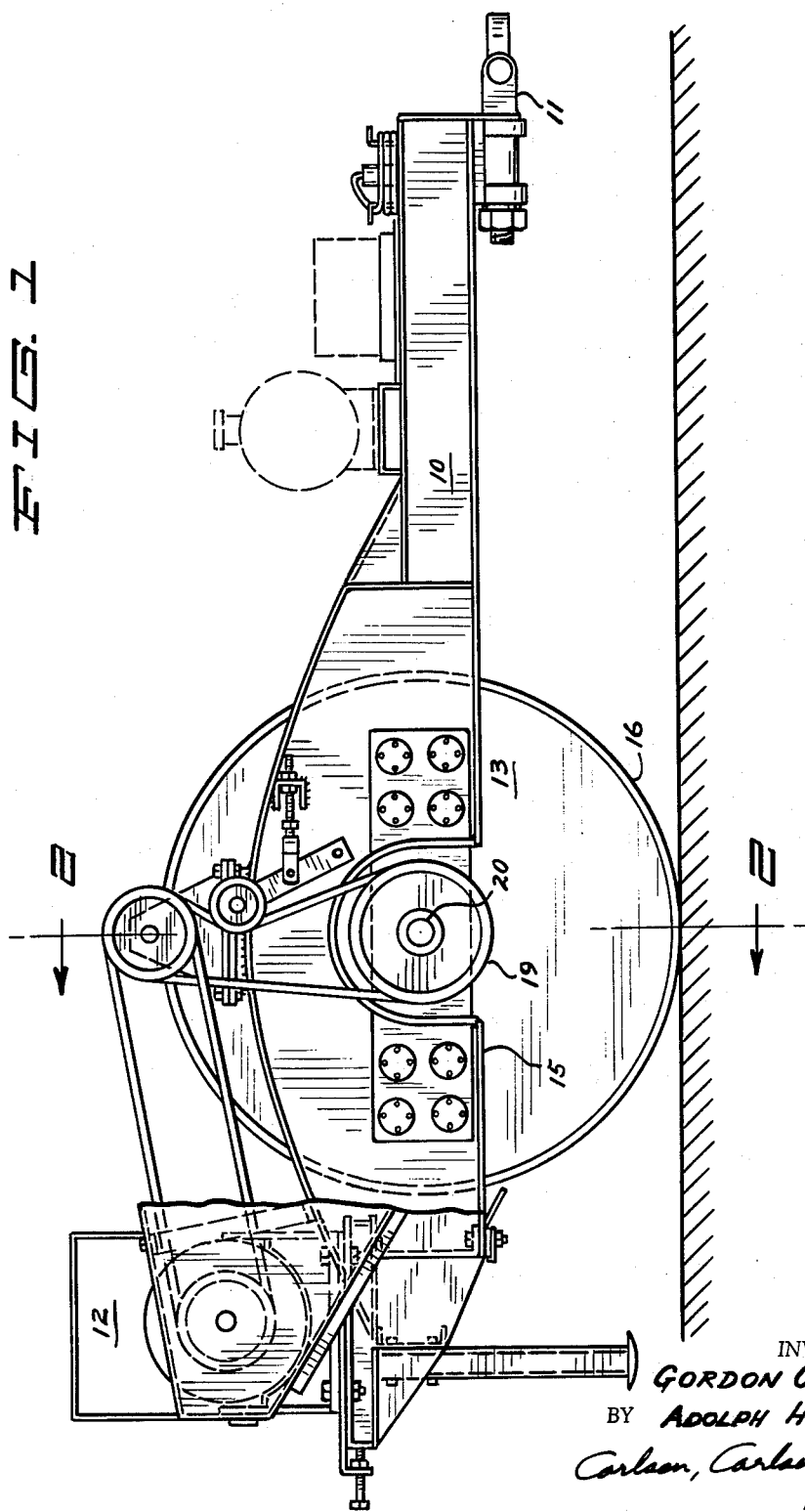
FIG. 1 is a side elevational view of a vibratory earth working machine embodying an earth contacting roller.

Referring now to the drawings, there is shown in FIG. 1 a vibratory earth roller which is comprised of a frame 10 having a hitch 11 attached at the forward end for connection to a source of motive power, for example, a crawler type tractor, and which includes mounting means for suitably rotatably journaling an earth roller assembly 13 intermediate the sides thereof. A motor means 12 is suitably mounted at the rear of frame 10 and is connected to drive an eccentric shaft 20 through suitable driving means shown in the form of V-belts which extend from motor 12 to a jack shaft mounted on the top of frame 10 and thence to a sheave drum 19 drivingly connected to shaft 20.

Roller assembly 13 includes an outer surface 16 which is shown in the form of a smooth cylindrical drum. Shown mounted on the top of the forward end of frame 10 are a tank and suitable controls to be used by an operator is controlling the operation of motor 12 for driving eccentric shaft 20.

In operation, the apparatus is slowly rolled over an area to be compacted and motor means 12 is energized to drive eccentric shaft 20 at a substantially higher speed than that of earth engaging rollers 16. In one mode of operation, the vehicle is drawn over the earth at a speed of approximately two miles per hour and shaft 20 is caused to rotate at a speed of approximately 1200 revolutions per minute. This provides approximately seven downwardly directed impacts for each foot of forward motion of the apparatus and illustrates that there is a substantial difference in the velocity of revolution of the earth engaging roller and the eccentric shaft.

Figure 2:
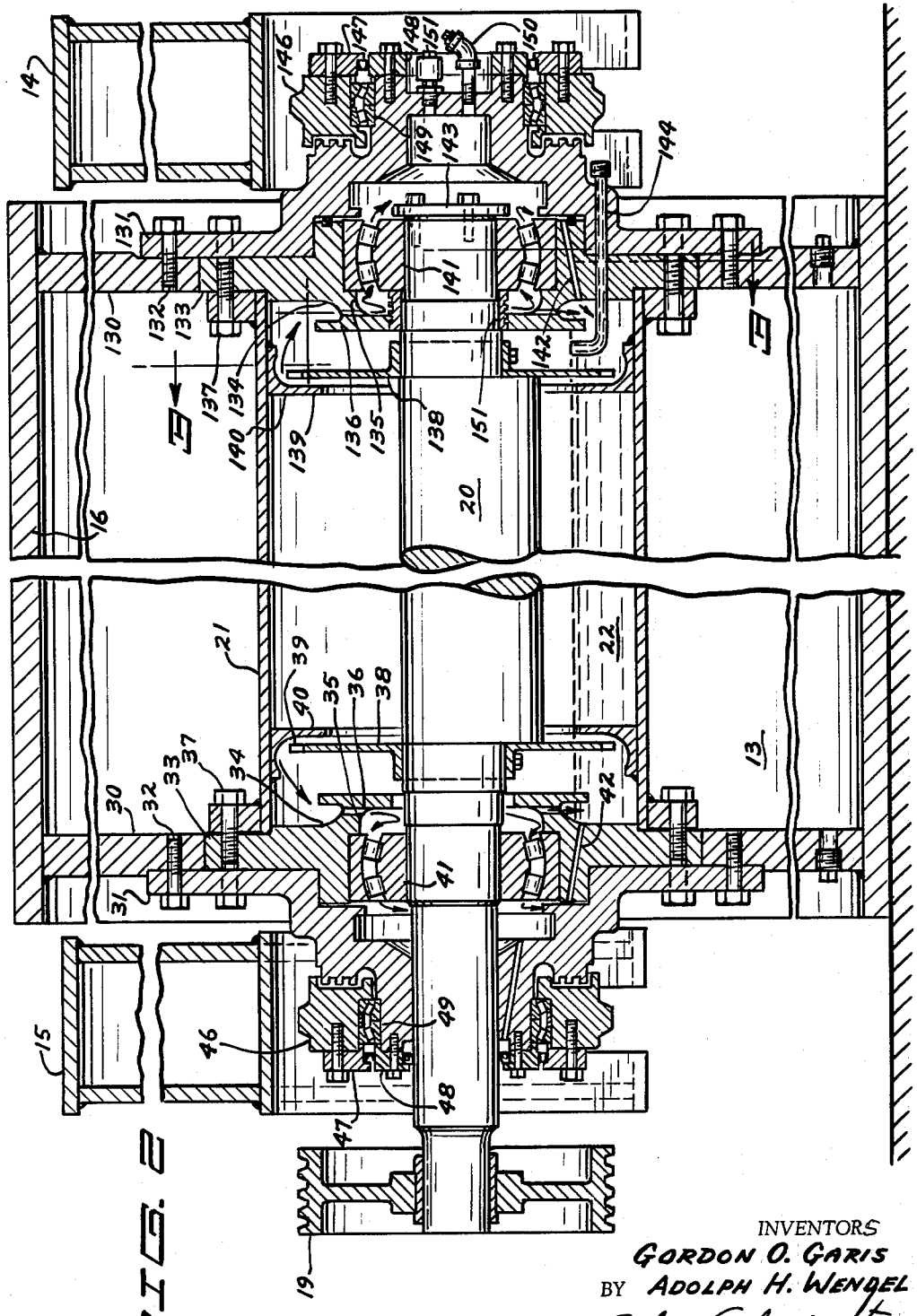
FIG. 2 is a sectional view of FIG. 1 taken along section lines 2—2 in which certain features have been omitted for the sake of clarity.
Figure 3:
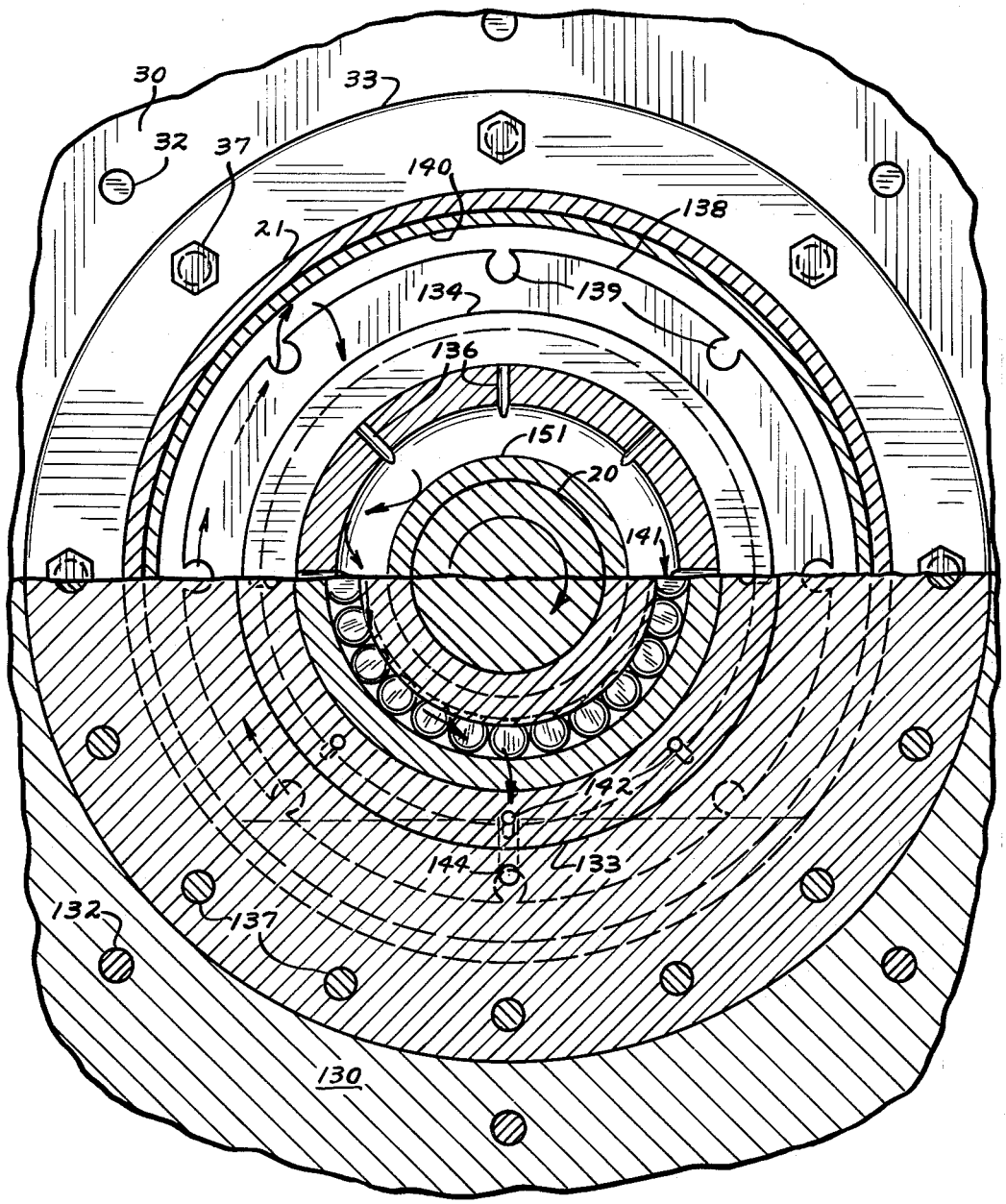
FIG. 3 is a sectional view taken along section line 3—3 on FIG. 2 to illustrate the various features of our invention.

The relatively high speed of the eccentric shaft requires a constant and adequate flow of lubricant to the bearings in which it is journaled and, as will be apparent from a consideration of FIGS. 2 and 3, our invention provides such an adequate and constant supply of lubricant.

Referring to FIGS. 2 and 3, roller assembly 13 includes an outer cylindrical shaped earth contacting drum 16 which is securely attached, as by welding, to a pair of annular inwardly extending end portions 30 and 130. It may be noted that wherever possible, similar reference numerals are applied to like parts at the right and left hand ends of FIG. 2 of the drawings. Each of the annular extending members 30 and 130 is provided with a plurality of spaced holes for receiving a like plurality of threaded fasteners. Attached with suitable threaded fasteners to the outside ends of members 30 and 130 are a pair of bearing retainer members 31 and 131 each of which is provided with outwardly extending bearing engaging surfaces for engagement with bearing members 49 and 149 respectively. Bearings 49 and 149 are held in bearing mounts 46 and 146 by retainer rings 47, 48 and 147 and 148 respectively. Bearing retainers 47, 48, 147, and 148 are attached to bearing mounts 46 and 146 by suitable threaded fastening means. Bearing mounts 46 and 146 are attached to rearwardly extending frame members 15 and 14 respectively through suitable vibration dampening means (not shown).

Left and right-hand bearing mounts 33 and 133 are positioned coaxially of left and right-hand bearing mounts 31 and 131 and annular members 30 and 130. Bearing mounts 33 and 133 are held in position by a plurality of screw threaded fastener means 37 and 137 respectively which extend through the left and right-hand flanges on housing member, or drum tube, 21 to provide a fluid confining interior chamber within drum assembly 13. Left and right-hand bearing assemblies 41 and 141 are positioned intermediate left and right-hand bearing mounts 31 and 131 and left and right-hand bearing mounts 33 and 133. A plurality of channels 42 and 142 extend axially of members 33 and 133 respectively to provide a means for the circulation of lubricant. Bearing mounts 33 and 133 are also provided with an inwardly extending portion which includes an annular groove 34 and 134 which faces radially outwardly from the axis of assembly 13 and a further radially inwardly facing annular groove 35 and 135 which is connected to annular grooves 34 and 134 through a plurality of radially extending openings 36 and 136.

A pair of left and right-hand deflector members 40 and 140 are attached by suitable means such as welding to the interior of circular drum member or housing 21 and are provided with annular radially inward facing grooves which provide a deflection surface as to be described in connection with the description of the operation of our invention.

Eccentric shaft 20 is journaled for rotation in bearing members 41 and 141. Eccentric shaft 20 is also provided with a plurality of sections of different diameters which are concentric with the axis of rotation of the shaft for reasons which may be apparent to one skilled in the art, for example, the right end of eccentric shaft 20 is adapted to engage the inner portion of bearing member 141 between a spacer member 151 mounted on eccentric shaft 20 and an end plate 143 which engages the right end of the inner portion of bearing member 141 and is attached to eccentric shaft 20 through suitable screw threaded fasteners. A suitable driving means adapted for connection, through a transmission as illustrated on FIG. 1, is shown securely mounted on the left end of eccentric shaft 20. The center portion of eccentric shaft 20 is constructed so that a considerable mass is positioned non-concentrically with the axis of rotation of shaft 20. This provides the desirable vibratory feature of the described embodiment of our invention.

A pair of fluid projecting surfaces or oil slinger members 38 and 138 are positioned at the inside right and left ends of eccentric shaft 20 and are mounted thereon for rotation concentric with the axis of shaft 20. Each of the oil slinger members 38 and 138 are provided with a plurality of pockets, or circular openings 139 extending axially therethrough and in communication with the outward radial extremity of the members. Pockets 139 are shown having an interior cross section of greater size than the outlet therefor.

It may therefore be seen that we have provided a drum type roller which has an interior substantially fluid tight housing and which contains an eccentric mass mounted on a shaft which is in turn mounted for rotation coaxially and within the drum assembly whereby the eccentric shaft 20 may be rotated at a substantially different velocity than the rotation of the entire drum assembly 13.

It will be noted that a quantity of fluid lubricant, 22, is present within the housing, defined by interior drum tube 21 and bearing mounts 33 and 133, their associated bearing members 41 and 141 and eccentric shaft 20. A suitable filler tube 150 and vent 151 extend outwardly from bearing mount 131. An overflow filler tube 144 extends through bearing mounts 131 and 133 into the interior of the assembly to provide a means for establishing a desirable quantity and level of fluid within.

*Operation*

In the embodiment shown a source of motive power, such as a crawler tractor, is attached to hitch 11 and motor means 12 is energized to drive eccentric shaft 20 through suitable driving means including drum sheave 19 which is connected to motor means 12 through appropriate driving means shown in the form of the familiar V-belts and which are connected through a jack shaft and suitable sheave drum to eccentric shaft 20. The speed of rotation is intended to be substantially greater than the rotation of drum assembly 13 as it is towed over the ground by the source of motive power. It has been observed that lubrication of bearing members 41 and 141 must be accomplished with a fluid having relatively low viscosity because of the large forces and substantially high velocity with which eccentric shaft 20 revolves. For slow rotational velocities as are encountered in bearing members 49 and 149, which serve to journal the entire roller assembly 13, high viscosity greases are adequate for providing lubrication.

In FIGS. 2 and 3 it may be noted that as the oil slingers 38 and 138 rotate at a relatively high speed with eccentric shaft 20, drum tube 21 rotates at a relatively slow speed as it is fixedly connected to outer drum 16 on drum assembly 13. As oil slinger members 38 and 138 revolve through the oil, which tends to remain at the bottom of the interior housing defined by drum tube 21, due to the force of gravity, a quantity of the lubricant fluid is picked up in pockets 139 around the outside periphery of oil slinger members 38 and 138. Centrifugal force serves to cause the fluid lubricant to be expelled radially outwardly toward deflector members 40 and 140. The shape of the inwardly facing annular grooves in deflector members 40 and 140 deflects the oil radially inwardly and axially outwardly of deflector members 40 and 140 so that the lubricant is directed toward the annular radially outwardly facing grooves 34 and 134 on bearing mounts 33 and 133. Because of the relatively slow rotational speed of the entire roller assembly 13, the fluid lubricant will, through the influence of gravity, proceed through the openings 36 and 136 from whence it tends to fall onto the surface of eccentric shaft 20 which is rotating at a substantially high velocity. The impingement on contact of the fluid lubricant with eccentric shaft 20 serves again to impart an outward radial force to the lubricant and it is propelled toward the annular radially inwardly facing grooves 35 and 135 on bearing mounts 33 and 133 and is thence deflected axially outwardly into bearing members 41 and 141. This is illustrated by the arrows shown on FIGS. 2 and 3 and a continuous adequate supply of lubricant of suitable viscosity is supplied to bearing members 41 and 141. The fluid may then proceed in the direction of the arrows through and around bearing members 41 and 141 to fluid openings 42 and 142 and openings 36 and 136 to the lowermost portion of drum tube, or housing 21, as indicated by reference character 22.

It may be noted that the deflector members 40 and 140 extend radially inwardly of drum tube 21 a distance sufficient to confine a substantial quantity of fluid lubricant at each end of the assembly so that there is always an adequate supply of lubricant to be picked up by fluid slinger members 38 and 138. This will provide an adequate supply of lubricant for bearing members 41 and 141 when the apparatus is operated under conditions where it is not always in a horizontal attitude.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In an earth compacting machine of the class wherein an eccentric mass is rotatably journaled on a shaft within an earth contacting roller, the combination comprising; a fluid confining housing mounted within and rotatable with a roller and surrounding a rotatable eccentric mass; a pair of bearing members, each of said bearing members including annular fluid receiving and fluid deflecting portions within said housing, said portions being interconnected by a plurality of passages, said bearings also including at least one passage interconnecting the inside and outside portions thereof; an eccentric shaft rotatably journaled in said bearings; a pair of fluid conveying members mounted on said shaft in proximity to the inside portions of said bearing means; and a corresponding pair of annular fluid deflecting means mounted on the inside of said fluid confining housing radially outwardly of said fluid conveying members whereby fluid within said housing is directed toward said deflecting means, to the fluid receiving portion on said bearing means, to said shaft and is further directed from said shaft to the deflecting portion on said bearing means through said bearing means and back to the inside of said fluid confining housing.

2. The apparatus of claim 1 in which the fluid confining housing is partially filled with fluid and the pair of fluid conveying members are circular.

3. The apparatus of claim 2 in which the fluid conveying members include a plurality of annularly disposed fluid collecting pockets extending axially therethrough and having a circumferentially disposed outlet for fluid collected therein of small cross-sectional area.

4. Earth compacting apparatus comprising in combination;
   (a) a cylindrical roller having a longitudinal axis of rotation;
   (b) a fluid confining inner housing disposed intermediate the ends of said roller and coaxial therewith;
   (c) a bearing mounted on each end of said roller and coaxial therewith;
   (d) a shaft journaled intermediate the bearings on said roller;
   (e) an eccentric mass disposed on said shaft;
   (f) first fluid conveying means including a fluid slinger means disposed on each end of said shaft axially inwardly of said bearings and annular fluid deflecting means disposed on said inner housing radially outwardly of each of said fluid slinger means; and
   (g) second fluid conveying means stationarily disposed on the inside of each end of said roller, said second fluid conveying means including an annular, radially outwardly opening fluid receiving means disposed axially intermediate the fluid deflecting means in said first fluid conveying means and the ends of said cylinder, and annular, radially inwardly opening deflecting means disposed axially intermediate the ends of said roller and said fluid receiving means and a plurality of ducts interconnecting said fluid receiving means and said last named fluid deflecting means.

5. The apparatus of claim 4 in which the fluid slinger in the first fluid conveying means is comprised of a disc stationary disposed on the shaft for rotation therewith.

6. The apparatus of claim 5 in which the disc includes a plurality of annularly spaced fluid receiving pockets.

7. The apparatus of claim 6 in which the pockets in the disc are comprised of radially inwardly disposed apertures, each having a radially outwardly opening and extending outlet.

References Cited by the Examiner

UNITED STATES PATENTS

| | | | |
|---|---|---|---|
| 2,003,339 | 6/1935 | Buckwalter | 308—86 |
| 2,422,061 | 6/1947 | Yager | 308—169 X |
| 2,466,822 | 4/1949 | Pollitz | 94—50 |
| 2,677,995 | 5/1954 | Wood | 94—48 |
| 2,766,629 | 10/1956 | Booth | 94—48 X |
| 3,026,781 | 3/1962 | Schafer | 94—50 |
| 3,048,089 | 8/1962 | Kaltenegger | 94—50 |
| 3,051,533 | 8/1962 | Brass | 308—86 |
| 3,052,166 | 9/1962 | Thrun | 94—48 |

CHARLES E. O'CONNELL, Primary Examiner.

JACOB NACKENOFF, Examiner.

N. C. BYERS, Assistant Examiner.